United States Patent
Pang

(10) Patent No.: US 9,940,607 B2
(45) Date of Patent: Apr. 10, 2018

(54) METHOD FOR RECORDING ELECTRONIC ATTENDANCE

(71) Applicant: Inforstandard Sdn Bhd, Kuala Lumpur (MY)

(72) Inventor: Kok Loong Pang, Kuala Lumpur (MY)

(73) Assignee: INFORSTANDARD SDN BHD, Kuala Lumpur (MY)

( * ) Notice: Subject to any disclaimer, the term of this patent is extended or adjusted under 35 U.S.C. 154(b) by 0 days.

(21) Appl. No.: 15/418,690

(22) Filed: Jan. 28, 2017

(65) Prior Publication Data

US 2017/0228699 A1   Aug. 10, 2017

(30) Foreign Application Priority Data

Jan. 28, 2016  (MY) ........................ PI 2016700304

(51) Int. Cl.
| | |
|---|---|
| *H04W 24/00* | (2009.01) |
| *G06Q 10/10* | (2012.01) |
| *H04W 4/00* | (2018.01) |
| *H04W 12/06* | (2009.01) |
| *H04L 29/08* | (2006.01) |
| *H04W 12/02* | (2009.01) |

(52) U.S. Cl.
CPC ......... *G06Q 10/1091* (2013.01); *H04L 67/24* (2013.01); *H04W 4/001* (2013.01); *H04W 4/008* (2013.01); *H04W 12/02* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 9,020,848 B1 | 4/2015 | Ridge et al. | |
| 2008/0296364 A1* | 12/2008 | Pappas | G06Q 10/06 235/377 |
| 2009/0219132 A1* | 9/2009 | Maytal | G06Q 30/018 340/5.8 |
| 2012/0223819 A1 | 9/2012 | Burgess et al. | |
| 2014/0025546 A1* | 1/2014 | Seng | G06Q 10/1091 705/32 |
| 2016/0364819 A1* | 12/2016 | Salimi | G06Q 50/205 |
| 2016/0381210 A1* | 12/2016 | Kenjalkar | H04M 1/72577 455/419 |

* cited by examiner

*Primary Examiner* — Shantell L Heiber
(74) *Attorney, Agent, or Firm* — Preston Smirman; Smirman IP Law, PLLC

(57) ABSTRACT

A system and method for recording electronic attendance, comprising the steps of: establishing, by a mobile device, a communication link between a server and the mobile device; activating, an application of the mobile device via an verification process; upon activation of the application, detecting and identifying, by the application, a checkpoint station carrying information relating to a checkpoint identifier; establishing, by the mobile device, a communication link between the checkpoint station and the mobile device for data transmission; reading, by the application, information relating to the checkpoint identifier from the checkpoint station; generating, by the application, an encrypted attendance record; transmitting, by the application, the encrypted attendance record to the server via the communication network; decrypting, by a decoder of the server, the encrypted attendance record; and updating, by the server, the record to an attendance report of an account.

6 Claims, 3 Drawing Sheets

METHOD FOR RECORDING ELECTRONIC ATTENDANCE

CROSS-REFERENCE TO RELATED APPLICATION

The instant application claims priority to Malaysia Patent Application Serial No. PI 2016700304 filed Jan. 28, 2016, the entire specification of which is expressly incorporated herein by reference.

FIELD OF THE INVENTION

The present invention generally relates to electronic attendance systems, and more particularly to systems and methods for recording electronic attendance via mobile devices.

BACKGROUND OF THE INVENTION

A conventional electronic attendance system requires a hardware device to store employees' credentials and to collect attendance records. The credentials can be employees' biometric information, cards/tag, or password. The drawback of having such hardware device is that it requires proper configuration and setup to work perfectly. The configuration and setup of the device can be very complicated most of the time and the administrator must receive appropriate training to setup the device. Also, the implementation fee to install the device and software is very expensive as the vendor may need to deploy professional technician to install and setup the device. Furthermore, the device also requires scheduled maintenance by the vendor to upkeep its performance. In the event of the hardware failure, this will cause inconvenience to the employees to report attendance and the employer to keep track of his employees' attendance. The freedom to switch to use any other brands of similar device is also limited so as to avoid incompatibilities issues of the legacy device. In addition to that, the device can only serve a single employee per time. During the peak period, this may cause employees to form a long queue at the device. If the device is a biometric device such as fingerprint device, hygienic issue will be another major concern to the employees.

U.S. Pat. No. 9,020,848 reveals a method for tracking time and location of an employee based on a predefined schedule. This method may uses time tracking software installed on a mobile device to detect the presence (or lack of presence) of an electronic signal emitted by a NFC (near field communication), BLE (Bluetooth Low Energy), or other wireless device. The detection may trigger the mobile application to communicate to a server to determine if the employee is scheduled to work at a work zone, which may result in the mobile application clocking in/out the employee. Also, geofencing may be used in combination with scheduling to clock in/out employees when entering a geofenced area determined by the employer. These location detection embodiments of the present invention may be used individually or in combination to improve location accuracy. A supervisor may also use this system to review the timesheets, make changes and integrate the data into a Payroll system.

US Patent Publication No. 20120223819 discloses a system for tracking an attendee at an event includes using NFC to track attendees' interaction with event stations at an event. Events are often crowded environments that can create interference issues for attendee tracking systems. The short range of NFC reduces interference issues and provides a reliable standard for system to track attendees in crowded environments. Another technical advantage of an embodiment is that an attendee can choose which event stations the attendee wants to have read the NFC tag associated with the attendee. In this embodiment, an event sponsor can determine that an attendee has affirmatively expressed interest in the stations that read the NFC tag associated with the attendee. Yet another technical advantage of an embodiment includes providing an efficient, low impact and simple method for event sponsors to track attendees, and attendees to interact with event stations. NFC tags are lightweight, affixable to articles that an attendee can carry or wear, and simple for an attendee to operate with little instruction.

SUMMARY OF THE INVENTION

The invention provides a method for recording electronic attendance comprising the following steps, e.g., in the sequence set forth, establishing, by a mobile device, a communication link between a server and the mobile device; activating, an application of the mobile device via an verification process; upon activation of the application, detecting and identifying, by the application, a checkpoint station carrying information relating to a checkpoint identifier; establishing, by the mobile device, a communication link between the checkpoint station and the mobile device for data transmission; reading, by the application, information relating to the checkpoint identifier from the checkpoint station; generating, by the application, an encrypted attendance record; transmitting, by the application, the encrypted attendance record to the server via the communication network; decrypting, by a decoder of the server, the encrypted attendance record; and updating, by the server, the record to an attendance report of an account.

Preferably, the communication link between the checkpoint and the mobile device is a near field communication (NFC).

Preferably, in the event of the mobile device successfully connected to the server, the verification process includes the steps of: receiving, by the mobile device, login identification and password; transmitting, by the mobile device, the received identification and password to the server; comparing, by the server, the identification and password with those pre-stored in a database to verify the user; and transmitting, by the server, an instruction to the application for activation upon the user is being verified.

Alternatively, in the event of the mobile device failed to connect to the server, the verification process includes the steps of: receiving, by the mobile device, login identification and password; comparing, by the mobile device, the identification and password with those pre-stored in a local database of the mobile device to verify the user; and activating, by the mobile device, the application to be activated upon the user is being verified.

Preferably, the generated encrypted attendance record is stored in the local database, and then being automatically transmitted to the server upon the establishment of communication link between the mobile device and the server.

In one embodiment of the invention, the method further comprises the steps of performing an authentication process, in which the authentication process includes the steps of: receiving, by a biometric device of the mobile device, biometric information relating to the user; transmitting, by the mobile device, the biometric information to the server; and comparing, by the server, the biometric information with those pre-stored in the database to recognise the user.

One skilled in the art will readily appreciate that the invention is well adapted to carry out the objects and obtain the ends and advantages mentioned, as well as those inherent therein. The embodiments described herein are not intended as limitations on the scope of the invention.

BRIEF DESCRIPTION OF THE DRAWINGS

For the purpose of facilitating an understanding of the invention, there is illustrated in the accompanying drawings the preferred embodiments from an inspection of which when considered in connection with the following description, the invention, its construction and operation and many of its advantages would be readily understood and appreciated.

DETAILED DESCRIPTION OF THE INVENTION

Figure 1:
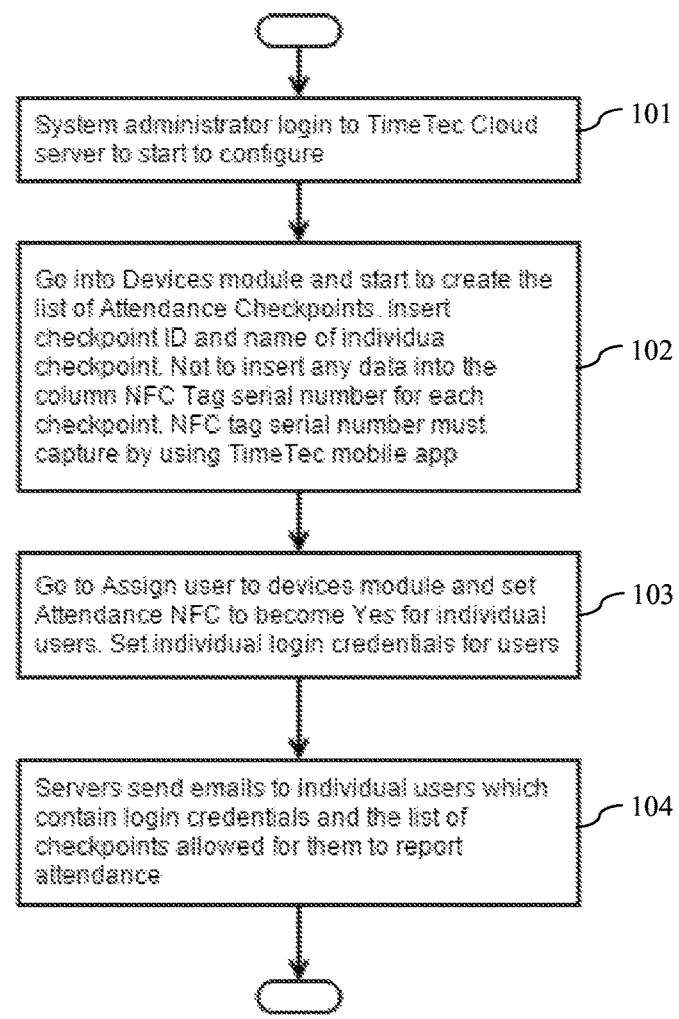
FIG. 1 is a flow chart illustrating a configuration process of a server.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, that execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions/acts specified in the flowchart and/or block diagram block or blocks.

A system for recording electronic attendance provided by the invention therein comprises at least one system server, a plurality of mobile devices with an attendance application installed therewithin, and a check point station. Preferably, the server includes one or more heavy duty computers for processing and transferring the received data received from the mobile device, and any known devices or group of devices to provide sufficient capacity for storing data. The servers may run on Microsoft Internet Information Services (IIS) in which supports My Structured Query Language (MYSQL) database, allowing the servers to consolidate data from the mobile device into the MYSQL database and centralize all the data.

The system server is connected by the plurality of mobile device via a wireless communication network. The communication network can be Code Division Multiple Access (CDMA) and its derivatives, Enhanced Data Rates for GSM Evolution (EDGE), 3G protocol, High Speed Packet Access (HSPA), 3GPP Long Term Evolution (LTE), GPRS cloud and the like, in accordance to the advancement of wireless technology with time.

The mobile devices are preferably hand-held devices such as personal digital assistants (PDA), smart phones, tablets, laptops, netbooks, phablets, phoblets, or any suitable means which capable of processing data and performing data transmission or other multifunctional electronic hand-held devices with compatible operating systems to support the application. Preferably, the hand-held devices comprise a display screen, data entry inputs via touch screen, keyboards or voice commands, near field communication (NFC) module, operating system to support the application and a camera to recognize face features of the user or any other biometric authentication means for detecting metrics related to the user human characteristics. The mobile devices may also further comprise a Global Positioning System (GPS) for detecting locations of each user at each clock-in or clock-out occasion and the detected location is preferred to be included with the related clock-in or clock-out occasion. As a result, time and location of the user can be recorded during attendance recording. The location can be presented in location information, civic address information or a combination thereof. Each mobile device bears a mobile identity, which is assigned by its manufacturer. The mobile identity is commonly known as International Mobile Equipment Identity (IMEI). The IMEI is used to differentiate the hand-held device and to avoid "buddy punching". "Buddy punching" generally refers to an act where employees at work clocking-in or punching-in attendances for their co-workers, especially when they are late for work.

The attendance application is a software application or programme which its functions are particularly suited for the mobile device. The attendance application includes sets of computer-executable instructions for each of its operations. Preferably, the attendance application allows the user to record their attendance to the server when certain criterion is met, to view or export the recorded attendance from the server, instructs the system of the mobile device to perform certain functions, and communicates with the system server through the communication network. The application may further provide an interactive messaging platform for the user to communicate with their superior or the administrator or to send notifications.

The checkpoint station is a NFC tag attachable at location where multiple users can establish a communication link to the station via their mobile devices. The NFC tag is preferably operated at a standard frequency of about 13 MHz. However, it should be noted that the stand frequency can be replaceable by any frequency which is detectable by the NFC module of the mobile device. The NFC tag contains a unique serial numbers.

In one preferred embodiment of the invention, whenever the user would like to record attendance, the user firstly performs a verification process to log-in the application. Then, the user is prompt to move the mobile device to NFC tag at a distance where a communication link between the mobile device and the NFC tag can be established. Upon the establishment of the communication link, the application automatically scans and reads the unique serial number, generates an attendance record, and transmits the record to the system server. The invention reverses the role of each component of a conventional attendance system by transforming each mobile device into an attendance recording system and the NFC tag into an attendance checkpoint. Since the verification process took place on each mobile device and the NFC tag allows multiple mobile devices to receive its series number at the same time, multiple users can clock-in or clock-out at the same instant.

As such, there is no installation, configuration and maintenance of hardware is needed as the attendance device is replaced by the NFC tag checkpoint. The configurations are done at the server rather than at the checkpoint. Furthermore, the NFC tag is a common electronic item which can be bought at a very low cost. The NFC is weather proof as the NFC components are concealed within and no maintenance or repairing is required at all. The NFC tag also comes in various shapes and patterns and it can be easily attached to a wall, a corner of a table, and etc. Moreover, the tag does not require additional power source as it can be active automatically while the mobile devices come near to it.

In another preferred embodiment of the invention, the attendance system is extended to human resource module and notification. The administrator can configure the system server to send notification or messages to attendance application of the mobile device while the user record their attendance at the checkpoints. The administrator can also configure "next action" for every checkpoint. The types of next action include, but are not limited to:

configure messages to display to all user or a dedicated user only;

configure notification to display to all user or a dedicated user only;

send an attendance summaries/tardiness to the user for display; and/or send a report to the user.

Besides instructions, the system administrator can also configure various types of notifications to send to the user who performs the same actions as described.

The invention will now be described in greater detail, by way of example, with reference to the drawings.

Referring to FIG. 1, the server configuration process of the system is depicted. In step 101, the system administrator is required to key-in user identification and password so as to login to the server for initiating the server configuration. In step 102, once the administrator successfully logged into the server, the administrator creates a list of attendance checkpoints through inserting the checkpoint ID and name of each checkpoint. In step 103, for each attendance checkpoints, the administrator assigns a set of users to that particular checkpoint so that assigned users can clock-in or clock-out at that checkpoint. In step 104, the server generates a notification message containing information relating to login credentials and then transmit the notification to the assigned users via emails, SMS, or instant messaging. Preferably, the generated login credentials and the created list of attendance checkpoints together with the assignment of users are stored in a cloud database.

Figure 2:
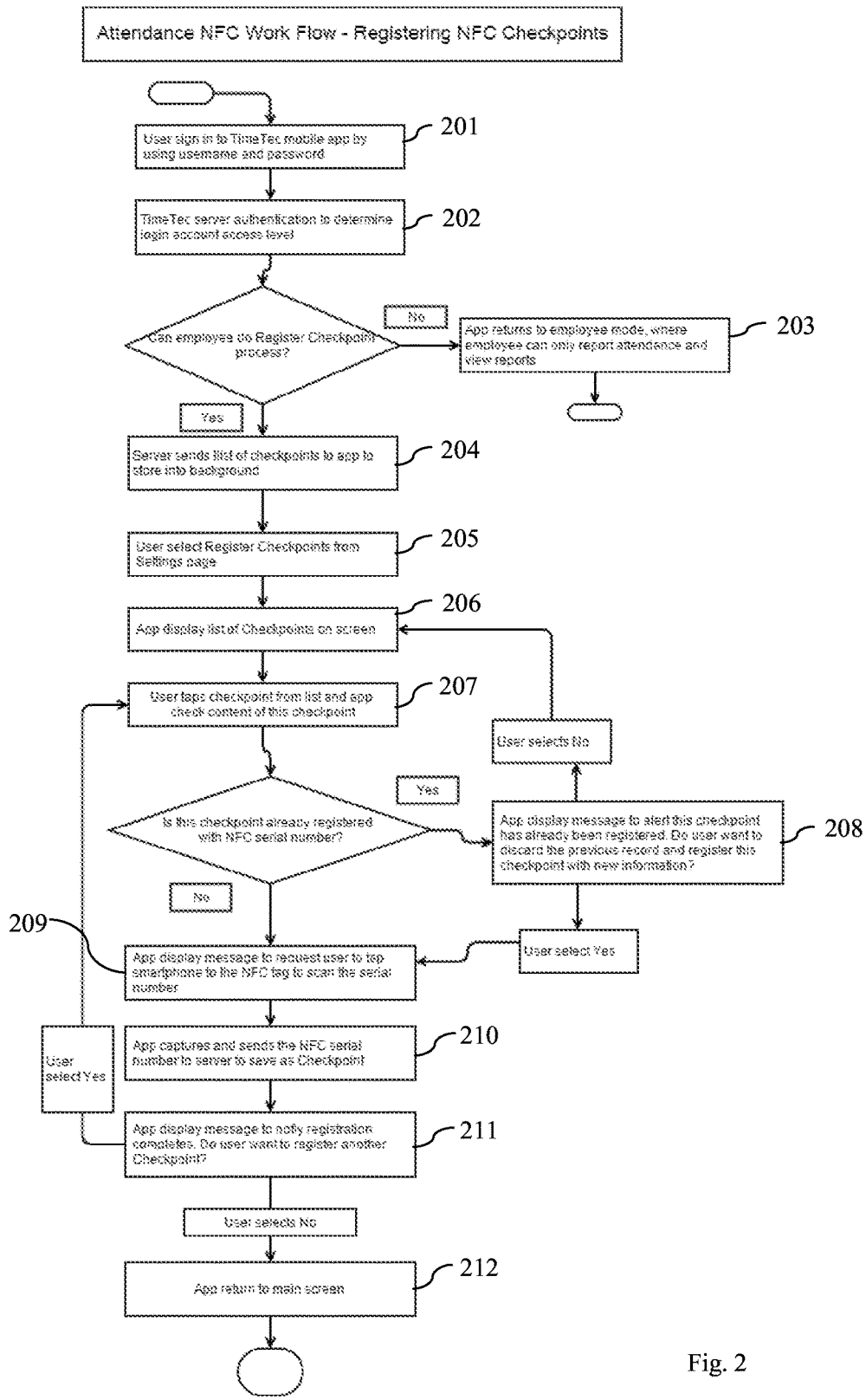
FIG. 2 is a flow chart illustrating a registration process of the NFC checkpoints.

Referring to FIG. 2, the registration process of the NFC checkpoints is shown. In step 201, the user actives and sign-in the attendance application by inputting the login credentials sent by the server. In step 202, the application sends the login credentials to the server so that the server can verify the user by comparing the login credentials with those stored in the database. In step 203, if the server failed to verify the user, the application will return to the initial mode where the user can only report attendance and view reports. In step 204, upon the user is verified, the server sends the list of checkpoints to the application. The list of checkpoints can be stored in a local storage of the mobile device. In step 205, the user is directed to a settings page upon selecting the register checkpoint option. In step 206, the application displays the list of checkpoints on the screen of the mobile device. In step 207, the user taps a designated checkpoint from the list and the application will check the content of this checkpoint. In step 208, if the checkpoint is already registered, the application will display a message to alert the selected checkpoint has already been registered. The user is further provided with option to discard the previous record and register the checkpoint with new information. In step 209, if the checkpoint is yet to be registered, the application will display a message to request the user to tap the mobile phone to the NFC tag for scanning the serial number. In step 210, the application captures and transmits the NFC serial number to server to register as a new checkpoint. In step 211, the application displays a message to notify that the registration is completed. The user is further provided with option to register another checkpoint. If the user selects yes, the application will direct the user back to step 207, else to step 212.

Figure 3:
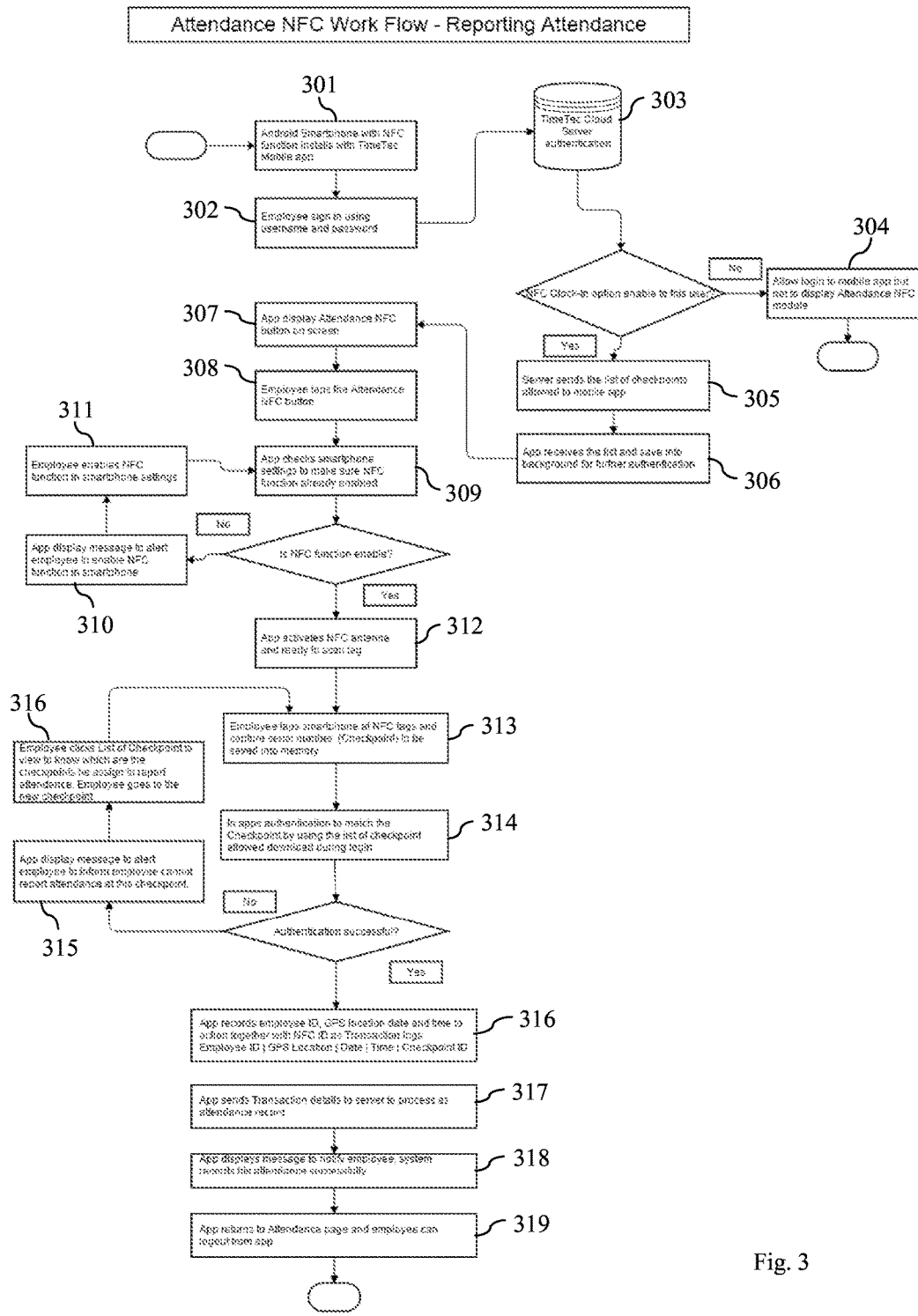
FIG. 3 is a flow chart illustrating a reporting process of the electronic attendance.

Referring to FIG. 3, the NFC attendance reporting work flow is illustrated. In step 301, the mobile device with NFC function is installed with the attendance application which is downloadable from the server. In step 302, the user logs in the application by inputting the login credentials sent by the server previously. In step 303, the server receives the login credentials from the mobile device and performs a verification and authentication process to verify the user. In step 304, in the event of the NFC module of the mobile device is disabled, the application only allows the user to login. In step 305, the server sends the list of allowed checkpoints to the mobile application if NFC module is enabled. In step 306, the application receives and stored the checkpoint list to the local database of the mobile device for further authentication purposes. In step 307, the application displays an attendance NFC button to enable the NFC detecting function. In steps 308 and 309, the application checks if the NFC function is enabled upon the user tapped on the attendance NFC button. In steps 310 and 311, if the NFC function is enabled, the application will display a message alerting the user to enable the NFC function of the mobile device and the user prompt to enable the NFC function through settings of the mobile device. In step 312, the application activates the NFC antenna. In step 313, the user taps the mobile device at the NFC checkpoint and the NFC module will scan and read for the serial number. Preferably, the captured serial number will be stored in the local database of the mobile device. In step 314, the application performs a matching by comparing the captured serial number with those stored in the local database to determine if the user is allowed to report attendance at that checkpoint. In step 315 and 316, the application displays a message to inform the user that the user cannot report attendance at that checkpoint if the authentication fails. The application further displays the list of checkpoints which the user is assigned. In steps 316 and 317, the application composes and sends information relating to the user, detected NFC serial number, location, date, and time to the server. In step 318, the application displays a message to notify the user about the completion of the attendance recording. In step 319, the application prompts the user to logout from the application.

The present disclosure includes as contained in the appended claims, as well as that of the foregoing description. Although this invention has been described in its preferred form with a degree of particularity, it is understood that the present disclosure of the preferred form has been made only by way of example and that numerous changes in the details of construction and the combination and arrangements of parts may be resorted to without departing from the scope of the invention.

What is claimed is:

1. A method for recording electronic attendance, comprising the steps of:
    providing a mobile telecommunication device;
    providing a server in wireless communication with the mobile telecommunication device;
    establishing, by the mobile telecommunication device, a wireless communication link between the server and the mobile telecommunication device;
    activating, an application of the mobile telecommunication device via a verification process;
    upon activation of the application, detecting and identifying, by the application, a checkpoint station carrying information relating to a checkpoint identifier;
    establishing, by the mobile telecommunication device, a wireless communication link between the checkpoint station and the mobile telecommunication device for data transmission;
    reading, by the application, information relating to the checkpoint identifier from the checkpoint station;
    generating, by the application, an encrypted attendance record;
    transmitting, by the application, the encrypted attendance record to the server via a wireless communication network;
    decrypting, by a decoder of the server, the encrypted attendance record; and
    updating, by the server, the record to an attendance report of an account.

2. The method according to claim 1, wherein the wireless communication link between the checkpoint and the mobile telecommunication device is a near field communication.

3. The method according to claim 1, whereby in the event of the mobile telecommunication device successfully connected to the server, the verification process includes the steps of:
    receiving, by the mobile telecommunication device, login identification and password;
    transmitting, by the mobile telecommunication device, the received identification and password to the server;
    comparing, by the server, the identification and password with those pre-stored in a database to verify the user; and
    transmitting, by the server, an instruction to the application for activation upon the user is being verified.

4. The method according to claim 1, whereby in the event of the mobile telecommunication device failed to connect to the server, the verification process includes the steps of:
    receiving, by the mobile telecommunication device, login identification and password;
    comparing, by the mobile telecommunication device, the identification and password with those pre-stored in a local database of the mobile device to verify the user; and
    activating, by the mobile telecommunication device, the application to be activated upon the user is being verified.

5. The method according to claim 4, wherein the generated encrypted attendance record is stored in the local database, and then being automatically transmitted to the server upon the establishment of the wireless communication link between the mobile telecommunication device and the server.

6. The method according to claim 1, further comprising the steps of performing an authentication process, wherein the authentication process includes the steps of:
    receiving, by a biometric device of the mobile telecommunication device, biometric information relating to the user;
    transmitting, by the mobile telecommunication device, the biometric information to the server; and
    comparing, by the server, the biometric information with those pre-stored in the database to recognize the user.

* * * * *